(12) United States Patent
LeCrone et al.

(10) Patent No.: US 11,349,921 B2
(45) Date of Patent: May 31, 2022

(54) CLOUD BASED STORAGE MIGRATION

(71) Applicant: EMC IP Holding Company LLC, Hopkinton, MA (US)

(72) Inventors: Douglas E. LeCrone, Hopkinton, MA (US); Brett A. Quinn, Lincoln, RI (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/567,538

(22) Filed: Sep. 11, 2019

(65) Prior Publication Data
US 2021/0075856 A1  Mar. 11, 2021

(51) Int. Cl.
*H04L 67/1097* (2022.01)

(52) U.S. Cl.
CPC .............................. *H04L 67/1097* (2013.01)

(58) Field of Classification Search
CPC .................................................... H04L 67/1097
See application file for complete search history.

(56) References Cited

U.S. PATENT DOCUMENTS

| | | | | |
|---|---|---|---|---|
| 6,446,176 B1 * | 9/2002 | West | .................... | G06F 11/2066 711/161 |
| 7,636,801 B1 * | 12/2009 | Kekre | ................. | H04L 67/1097 709/218 |
| 9,823,973 B1 * | 11/2017 | Natanzon | ............ | G06F 11/1451 |
| 10,310,760 B1 * | 6/2019 | Dreier | .................... | G06F 3/0631 |
| 10,416,919 B1 * | 9/2019 | Cai | ........................ | G06F 3/0605 |
| 2010/0332401 A1 * | 12/2010 | Prahlad | ............... | H04L 63/0428 705/80 |
| 2012/0079224 A1 * | 3/2012 | Clayton | .............. | G06F 11/1448 711/162 |
| 2013/0304866 A1 * | 11/2013 | Wu | ...................... | H04L 67/1097 709/219 |
| 2013/0326159 A1 * | 12/2013 | Vijayan | ................. | G06F 3/0605 711/148 |
| 2015/0212897 A1 * | 7/2015 | Kottomtharayil | ....... | G06F 11/00 714/20 |
| 2016/0078245 A1 * | 3/2016 | Amarendran | ........... | H04L 67/10 713/193 |
| 2017/0154093 A1 * | 6/2017 | Shetty | ...................... | G06F 3/067 |
| 2020/0341864 A1 * | 10/2020 | Agrawal | .............. | G06F 11/1469 |
| 2021/0064298 A1 * | 3/2021 | Hasegawa | .............. | G06F 3/0647 |

\* cited by examiner

*Primary Examiner* — Kristie D Shingles
(74) *Attorney, Agent, or Firm* — Muirhead and Saturnelli, LLC

(57) ABSTRACT

Migrating data from a first storage system to a second storage system includes transferring the data from the first storage system to a cloud storage, transferring the data from the cloud storage to the second storage system, quiescing the first storage system prior to transferring remaining data from the first storage system to the cloud storage, and transferring remaining data from the cloud storage to the second storage system to complete migration of the data. The cloud storage may be accessible only through a private network or via the World Wide Web. Quiescing the first storage system may include the first storage system rejecting write operations or may include one or more external systems coupled to the first storage system foregoing write operations. Snapshots may be performed at the first storage system in response to commands provided by a host coupled to the first storage system.

20 Claims, 4 Drawing Sheets

CLOUD BASED STORAGE MIGRATION

TECHNICAL FIELD

This application relates to the field of computer systems and storage systems therefor and, more particularly, to the field of transferring data between storage systems.

BACKGROUND OF THE INVENTION

Host processor systems (hosts) may store and retrieve data using a storage system containing a plurality of host interface units (I/O modules), physical storage units (e.g., disk drives, solid state drives), and disk interface units (disk adapters). The host systems access the storage system through a plurality of channels provided therewith. Host systems provide data and access control information through the channels to the storage system and the storage system provides data to the host systems also through the channels. The host systems do not address the physical storage units of the storage system directly, but rather, access what appears to the host systems as a plurality of logical volumes. The logical volumes may or may not correspond to the physical storage units. Allowing multiple host systems to access the single storage system allows the host systems to share data stored therein.

In some cases, it is desirable to migrate data from one storage system to another. For example, if a first storage system needs to be taken offline for maintenance, then, prior to the maintenance, data may be migrated from the first storage system to a second storage system. Operations that were performed by the first storage system are performed by the second storage system during the maintenance and, in some cases, the data may be modified during the maintenance. Subsequently, data is migrated from the second storage system back to the first storage system and operations using the first storage system are resumed.

When all of the storage systems are provided by the same vendor, it is relatively straightforward to migrate data from one storage system to another. On the other hand, when storage systems are provided by different vendors, then data migration may be difficult because the storage systems may be unable to coordinate and communicate with each other in a way that is necessary for data migration. Moreover, even in cases where the storage systems are provided by the same vendor, it may be difficult to establish an appropriate communication path between the storage systems to facilitate proper data migration.

Accordingly, it is desirable to provide a mechanism to facilitate data migration between storage systems.

SUMMARY OF THE INVENTION

According to the system described herein, migrating data from a first storage system to a second storage system includes transferring the data from the first storage system to a cloud storage, transferring the data from the cloud storage to the second storage system, quiescing the first storage system prior to transferring remaining data from the first storage system to the cloud storage, and transferring remaining data from the cloud storage to the second storage system to complete migration of the data. The cloud storage may be accessible only through a private network or via the World Wide Web. Quiescing the first storage system may include the first storage system rejecting write operations or may include one or more external systems coupled to the first storage system foregoing write operations. Transferring data between the cloud storage and the storage systems and quiescing the first storage system may be performed by one or more hosts coupled to the storage systems providing conventional storage system commands to the storage systems. Migrating data from a first storage system to a second storage system may include performing snapshots at the first storage system, where the data transferred from the first storage system to the cloud storage corresponds to the snapshots. Snapshots may be performed at the first storage system in response to commands provided by a host coupled to the first storage system. Data may be exchanged between a host system and the first storage system at least during an initial phase of migrating data. Data being exchanged between the host system and the first storage system may be suspended during a subsequent phase of migrating data that follows the initial phase of migrating data.

According further to the system described herein, a non-transitory computer readable medium contains software that migrates data from a first storage system to a second storage system. The software includes executable code that transfers the data from the first storage system to a cloud storage, executable code that transfers the data from the cloud storage to the second storage system, executable code that quiesces the first storage system prior to transferring remaining data from the first storage system to the cloud storage, and executable code that transfers remaining data from the cloud storage to the second storage system to complete migration of the data. The cloud storage may be accessible only through a private network or via the World Wide Web. Quiescing the first storage system may include the first storage system rejecting write operations or may include one or more external systems coupled to the first storage system foregoing write operations. Transferring data between the cloud storage and the storage systems and quiescing the first storage system may be performed by one or more hosts coupled to the storage systems providing conventional storage system commands to the storage systems. The software may include executable code that performs snapshots at the first storage system, where the data transferred from the first storage system to the cloud storage corresponds to the snapshots. Snapshots may be performed at the first storage system in response to commands provided by a host coupled to the first storage system. Data may be exchanged between a host system and the first storage system at least during an initial phase of migrating data. Data being exchanged between the host system and the first storage system may be suspended during a subsequent phase of migrating data that follows the initial phase of migrating data.

BRIEF DESCRIPTION OF THE DRAWINGS

Embodiments of the system are described with reference to the several figures of the drawings, noted as follows.

DETAILED DESCRIPTION OF VARIOUS EMBODIMENTS

The system described herein migrates storage system data using a cloud storage. The source storage system and the destination storage system do not need to communicate directly or be from the same vendor. In some embodiments, the migration is facilitated by hosts providing conventional storage system commands to the storage systems so that the storage systems do not need to perform any special migration operations.

Figure 1:
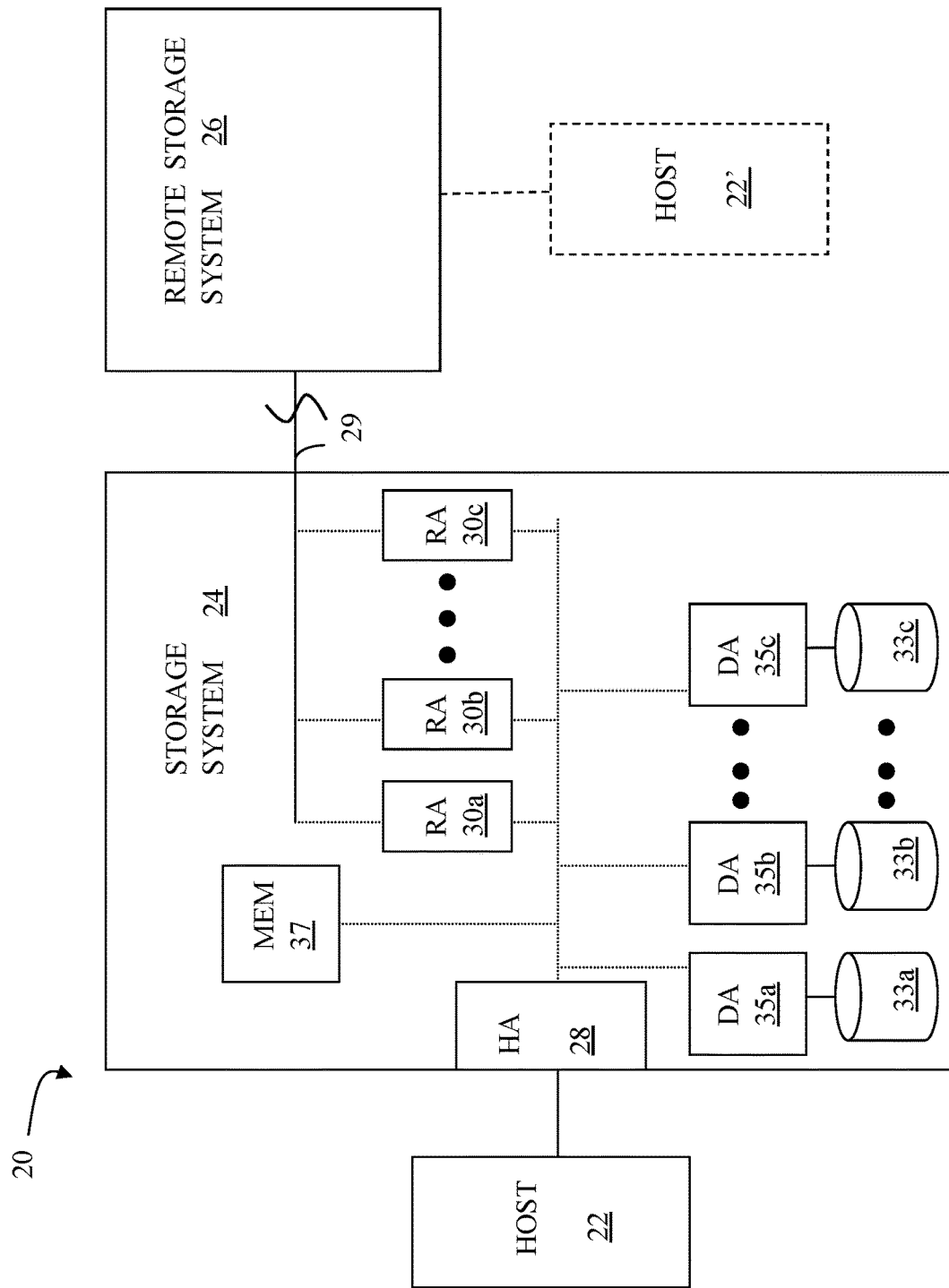
FIG. 1 is a schematic illustration showing a relationship between a host and a storage system that may be used in connection with an embodiment of the system described herein.

FIG. 1 is a diagram 20 showing a relationship between a host 22 and a storage system 24 that may be used in connection with an embodiment of the system described herein. In an embodiment, the storage system 24 may be a PowerMax or VMAX storage system produced by Dell EMC of Hopkinton, Mass.; however, the system described herein may operate with other appropriate types of storage systems. Also illustrated is another (remote) storage system 26 that may be similar to, or different from, the storage system 24 and may, in various embodiments, be coupled to the storage system 24, using, for example, a network. The host 22 reads and writes data from and to the storage system 24 via an HA 28 (host adapter), which facilitates an interface between the host 22 and the storage system 24. Although the diagram 20 shows the host 22 and the HA 28, it will be appreciated by one of ordinary skill in the art that multiple host adaptors (possibly of different configurations) may be used and that one or more HAs may have one or more hosts coupled thereto.

In an embodiment of the system described herein, in various operations and scenarios, data from the storage system 24 may be copied to the remote storage system 26 via a link 29. For example, transferring data may be part of a data mirroring or replication process that causes data on the remote storage system 26 to be identical to the data on the storage system 24. Although only the one link 29 is shown, it is possible to have additional links between the storage systems 24, 26 and to have links between one or both of the storage systems 24, 26 and other storage systems (not shown). The storage system 24 may include a first plurality of remote adapter units (RA's) 30a, 30b, 30c. The RA's 30a-30c may be coupled to the link 29 and be similar to the HA 28, but are used to transfer data between the storage systems 24, 26.

The storage system 24 may include one or more physical storage units (including disks, solid state storage devices, etc.), each containing a different portion of data stored on the storage system 24. FIG. 1 shows the storage system 24 having a plurality of physical storage units 33a-33c. The storage system 24 (and/or remote storage system 26) may be provided as a stand-alone device coupled to the host 22 as shown in FIG. 1 or, alternatively, the storage system 24 (and/or remote storage system 26) may be part of a storage area network (SAN) that includes a plurality of other storage systems as well as routers, network connections, etc. (not shown in FIG. 1). The storage systems may be coupled to a SAN fabric and/or be part of a SAN fabric. The system described herein may be implemented using software, hardware, and/or a combination of software and hardware where software may be stored in a computer readable medium and executed by one or more processors.

Each of the physical storage units 33a-33c may be coupled to a corresponding disk adapter unit (DA) 35a-35c that provides data to a corresponding one of the physical storage units 33a-33c and receives data from a corresponding one of the physical storage units 33a-33c. An internal data path exists between the DA's 35a-35c, the HA 28 and the RA's 30a-30c of the storage system 24. Note that, in other embodiments, it is possible for more than one physical storage unit to be serviced by a DA and that it is possible for more than one DA to service a physical storage unit. The storage system 24 may also include a global memory 37 that may be used to facilitate data transferred between the DA's 35a-35c, the HA 28 and the RA's 30a-30c as well as facilitate other operations. The memory 37 may contain task indicators that indicate tasks to be performed by one or more of the DA's 35a-35c, the HA 28 and/or the RA's 30a-30c, and may contain a cache for data fetched from one or more of the physical storage units 33a-33c.

The storage space in the storage system 24 that corresponds to the physical storage units 33a-33c may be subdivided into a plurality of volumes or logical devices. The logical devices may or may not correspond to the storage space of the physical storage units 33a-33c. Thus, for example, the physical storage unit 33a may contain a plurality of logical devices or, alternatively, a single logical device could span both of the physical storage units 33a, 33b. Similarly, the storage space for the remote storage system 26 may be subdivided into a plurality of volumes or logical devices, where each of the logical devices may or may not correspond to one or more physical storage units of the remote storage system 26.

In some embodiments, an other host 22' may be provided. The other host 22' is coupled to the remote storage system 26 and may be used for disaster recovery so that, upon failure at a site containing the host 22 and the storage system 24, operation may resume at a remote site containing the remote storage system 26 and the other host 22'. In some cases, the host 22 may be directly coupled to the remote storage system 26, thus protecting from failure of the storage system 24 without necessarily protecting from failure of the host 22.

Figure 2:
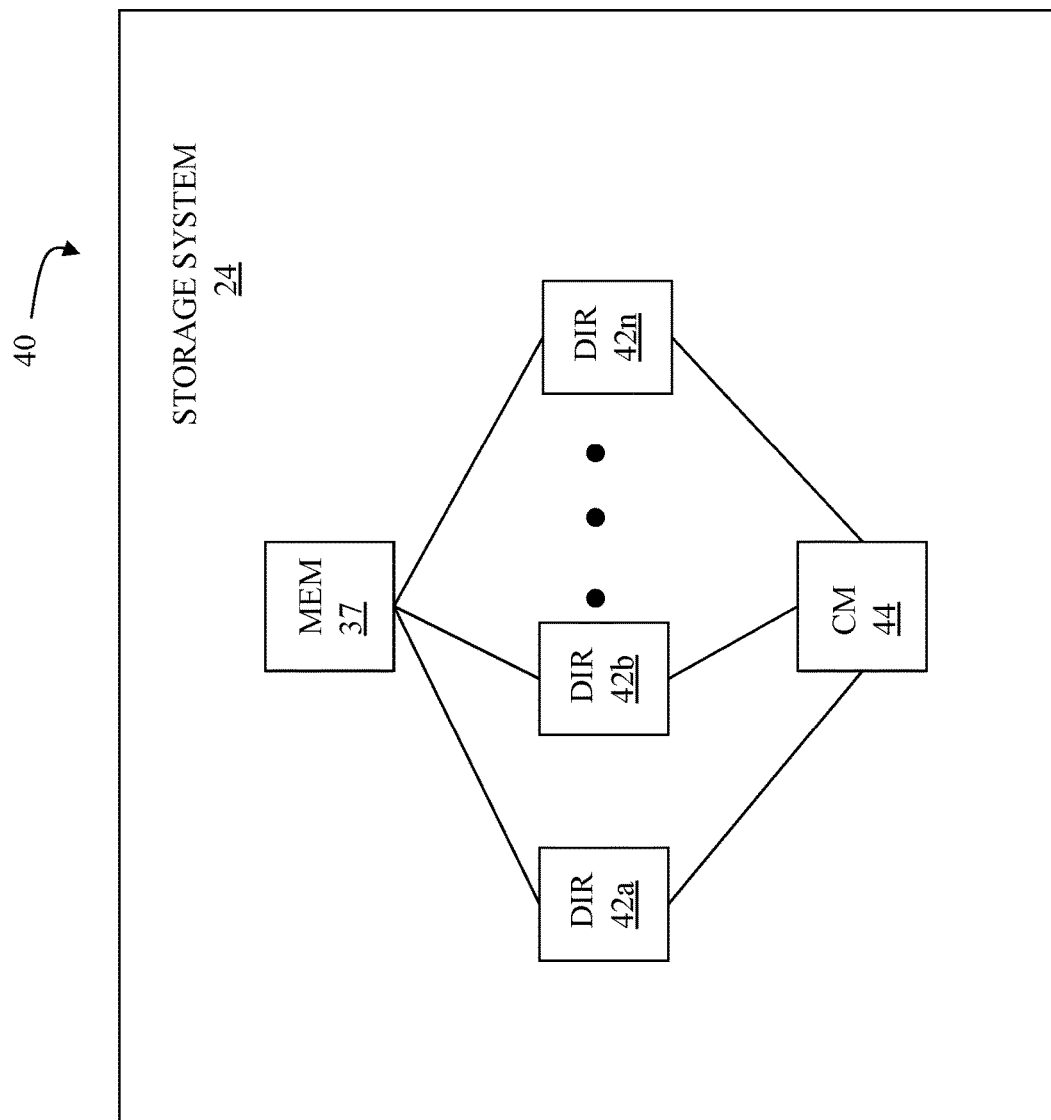
FIG. 2 is a schematic diagram illustrating an embodiment of a storage system where each of a plurality of directors are coupled to a memory according to an embodiment of the system described herein.

FIG. 2 is a schematic diagram 40 illustrating an embodiment of the storage system 24 where each of a plurality of directors 42a-42n are coupled to the memory 37. Each of the directors 42a-42n represents at least one of the HA 28, RAs 30a-30c, or DAs 35a-35c. The diagram 40 also shows an optional communication module (CM) 44 that provides an alternative communication path between the directors 42a-42n. Each of the directors 42a-42n may be coupled to the CM 44 so that any one of the directors 42a-42n may send a message and/or data to any other one of the directors 42a-42n without needing to go through the memory 37. The CM 44 may be implemented using conventional MUX/router technology where one of the directors 42a-42n that is sending data provides an appropriate address to cause a message and/or data to be received by an intended one of the directors 42a-42n that is receiving the data. Some or all of the functionality of the CM 44 may be implemented using one or more of the directors 42a-42n so that, for example, the directors 42a-42n may be interconnected directly with the interconnection functionality being provided on each of the directors 42a-42n. In addition, one or more of the directors 42a-42n may be able to broadcast a message to all or at least some plurality of the other directors 42a-42n at the same time.

In some embodiments, one or more of the directors 42a-42n may have multiple processor systems thereon and thus may be able to perform functions for multiple discrete directors. In some embodiments, at least one of the directors 42a-42n having multiple processor systems thereon may simultaneously perform the functions of at least two different types of directors (e.g., an HA and a DA). Furthermore, in some embodiments, at least one of the directors 42a-42n having multiple processor systems thereon may simultaneously perform the functions of at least one type of director and perform other processing with the other processing system. In addition, all or at least part of the global memory 37 may be provided on one or more of the directors 42a-42n and shared with other ones of the directors 42a-42n. In an embodiment, the features discussed in connection with the storage system 24 may be provided as one or more director boards having CPUs, memory (e.g., DRAM, etc.) and interfaces with Input/Output (I/O) modules.

Note that, although specific storage system configurations are disclosed in connection with FIGS. 1 and 2, it should be understood that the system described herein may be implemented on any appropriate platform. Thus, the system described herein may be implemented using a platform like that described in connection with FIGS. 1 and 2 or may be implemented using a platform that is somewhat or even completely different from any particular platform described herein.

A storage area network (SAN) may be used to couple one or more host systems with one or more storage systems in a manner that allows reconfiguring connections without having to physically disconnect and reconnect cables from and to ports of the devices. A storage area network may be implemented using one or more switches to which the storage systems and the host systems are coupled. The switches may be programmed to allow connections between specific ports of devices coupled to the switches. A port that can initiate a data-path connection may be called an "initiator" port while the other port may be deemed a "target" port.

Figure 3A:
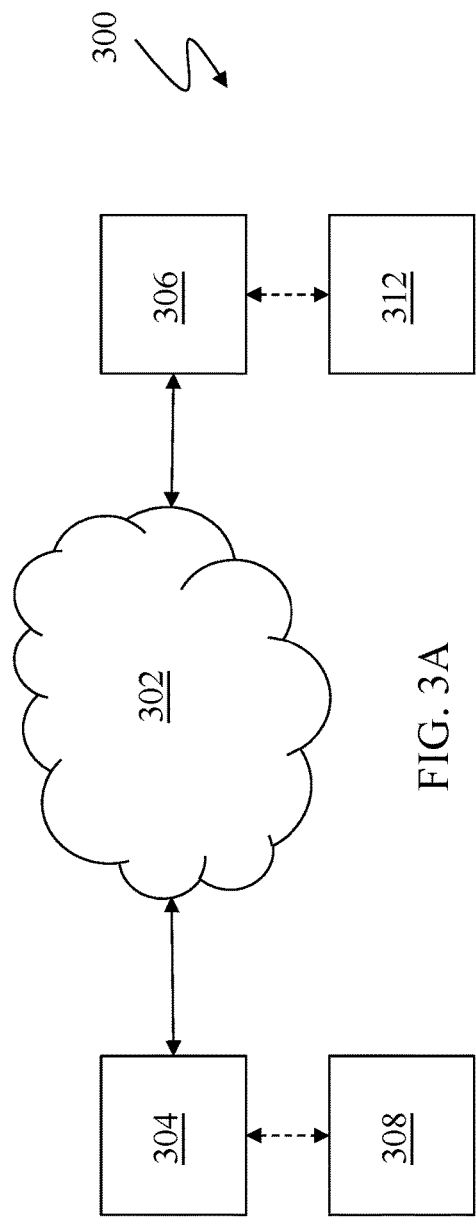
FIGS. 3A and 3B are schematic diagrams showing a cloud storage, storage systems coupled thereto, and hosts coupled to the storage systems according to embodiments of the system described herein.

Referring to FIG. 3A, a diagram 300 illustrates data migration using a cloud storage 302. The cloud storage 302 may be a private cloud storage provided by an organization for its own internal use, a semi-private cloud storage provided by a collection of organizations for use by members, or a public cloud storage such as Amazon Web Service (AWS) or Microsoft Azure. The cloud storage 302 provides security controls so that only authorized users may access data and possibly so that it is possible for some of the users to only be able to read data. In an embodiment herein, the cloud storage 302 may be accessible from any location via the World Wide Web, although it may be possible to impose restrictions on access, such as geographic restrictions (e.g., prohibiting access from Internet addresses originating in certain countries). In other embodiments, the cloud storage 302 may be part of a private network that is not generally accessible, but may nonetheless be geographically diverse.

A first storage system 304 and a second storage system 306 are couple to the cloud storage 302 and exchange data therewith. One or both of the storage systems 304, 306 may be similar to the storage system 24, described above, and may be storage arrays provided by Dell EMC of Hopkinton, Mass., although other types of storage systems are possible. Data connections between the storage systems 304, 306 and the cloud storage 302 may be provided by any appropriate mechanism, including the Internet, other TCP/IP networks, dedicated connections, FICON connections, etc. In some embodiments, the system may be configured to cause one or both of the storage systems 304, 306 to exchange data with the cloud storage 302 using protocols for exchanging data directly between storage systems, including synchronous and asynchronous protocols, and using the RAs 30a-30c, discussed above, or similar. In such a case, the cloud storage 302 may effectively emulate a storage system for purposes of exchanging data with actual storage systems. In some instances, the emulation may be provided, at least in part, by operation of actual storage systems that are connected to the cloud storage 302.

Each of the storage systems 304, 306 may provide data storage for one or more host systems coupled thereto so that, for example, the storage system 304 provides data storage for a host 308 and the storage system 306 provides data storage for a host 312. The host 308 may be coupled to the storage system 304 using any appropriate mechanism. Similarly, the host 312 may be coupled to the storage system 308 using any appropriate mechanism.

Data is migrated from the storage system 304 to the storage system 306 using the cloud storage 302. The data being migrated is uploaded from the storage system 304 to the cloud storage 302. The storage system 304 may be interacting with the host 308 at least during an initial phase of the migration. In some embodiments, interaction between the host 308 and the storage system 304 is suspended at a subsequent phase (an end of the transfer process) to allow the system to quiesce. This is described in more detail elsewhere herein. Data is transferred from the cloud storage 302 to the storage system 306 to complete the migration. Following the migration, the host 312 may interact with the storage system 306 using the migrated data. In some embodiments, the host 312 and the storage system 306 may adopt one or more workloads that were previously performed by the host 308 and the storage system 304. For example, the system may explicitly halt one or more applications running on the host 308 and restart the same application(s) on the host 312 using the data that was migrated.

Figure 3B:
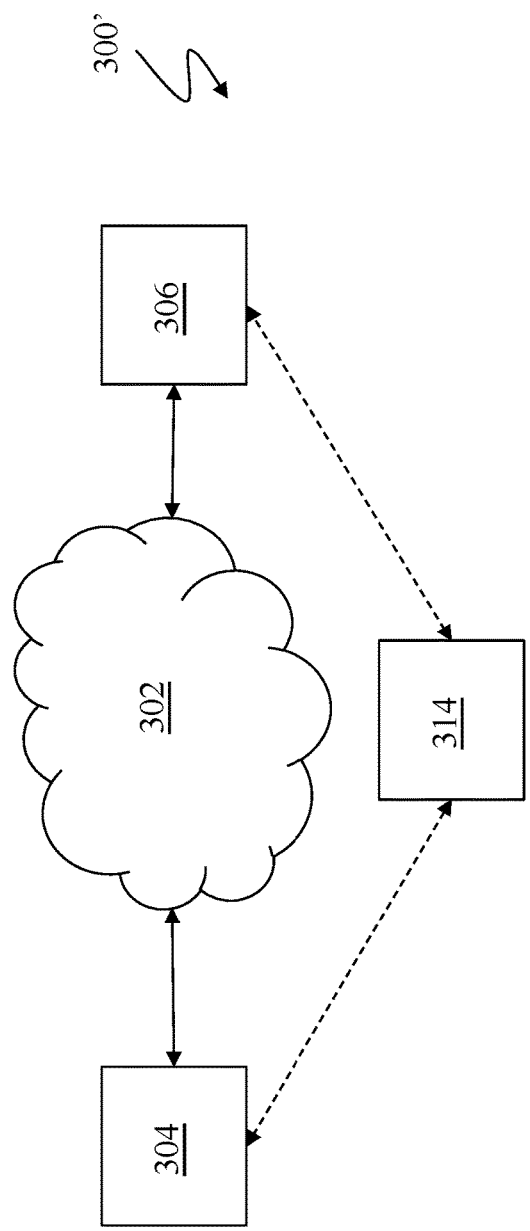

Referring to FIG. 3B, a diagram 300' illustrates a system that is similar to the system described above in connection with the diagram 300. The diagram 300' shows the storage systems 304, 306 coupled to the cloud storage 302. However, in the diagram 300', a host 314 is coupled to both the storage system 304 and the storage system 306. Data is migrated from the storage system 304 to the storage system, 306 using the cloud storage 302. However, the host 314 exchanges data with both of the storage systems 304, 306. Thus, following the migration, the host 314 may interact with the storage system 306 using the migrated data and may adopt one or more workloads that were previously performed by the host 314 and the storage system 304. For example, the system may perform an autoswap where one or more applications using the storage system 304 are switched to use the storage system 306 while the application(s) are running.

The use of the cloud storage 302 allows the storage systems 304, 306 to be provided by different vendors and, in fact, coordination between the storage systems 304, 306 may not be provided or be necessary at all. In some embodiments, all that is necessary is that the storage systems 304, 306 be able to exchange data with the cloud storage 302. In instances where it is necessary to quiesce the system, it is possible to simply cause one or both of the hosts 308, 312 to stop writing data. For example, in connection with migrating data from the storage system 304 to the storage system 308, the host 308 may be directed to cease writing data to the storage system 304 in order to quiesce the system in connection with the migration. This is described in more detail elsewhere herein.

Figure 4:
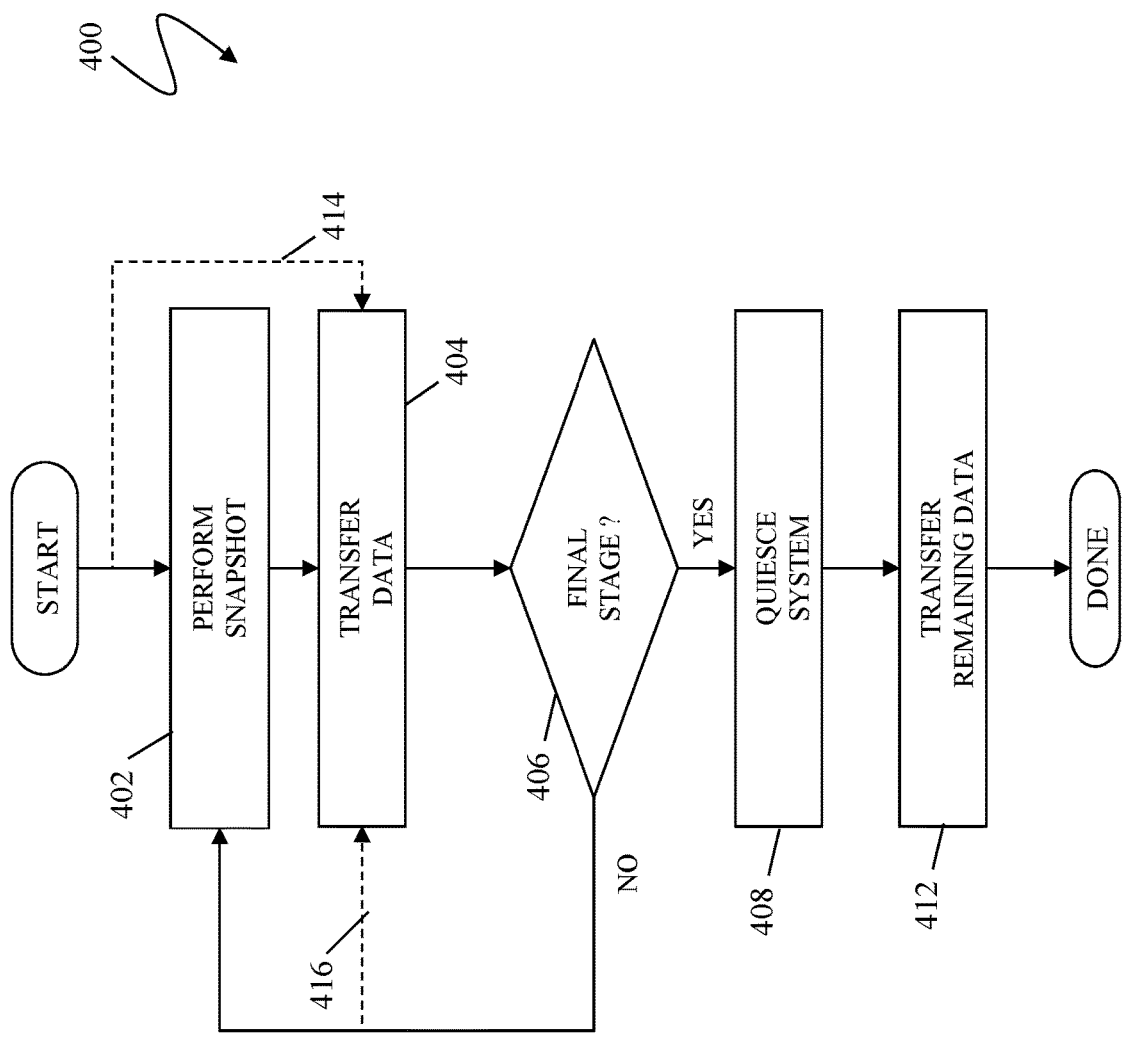
FIG. 4 is a flow diagram showing processing performed in connection with migrating data from one storage system to another storage system according to embodiments of the system described herein.

Referring to FIG. 4, a flow diagram 400 illustrates processing performed at the storage system 304 in connection with migrating data from the storage system 304 to the storage system 306 via the cloud storage 302. Processing begins at a first step 402 where the storage system 304 obtains a snapshot of a current state of the data at the storage system 304. Snapshot functionality provided at the step 402 may include any appropriate type of snapshot mechanism, including known, conventional, snapshot mechanisms. The snapshot mechanism (or similar) at the step 402 maintains a point-in-time state of the data. Following the step 402 is a step 404 where the snapshot version of the data is transferred to the cloud storage 302. In some embodiments, all of the data stored at the storage system 304 is transferred to the cloud storage 302 in connection with the migration. In other embodiments, only some of the data (e.g., one or more logical volumes, data from one or more physical devices, etc.) is transferred in connection with the migration.

Following the step 404 is a test step 406 where it is determined whether the migration is entering a final stage. The test at the step 406 is discussed in more detail elsewhere herein. If it is determined at the test step 406 that the migration is not entering a final stage, then control transfers from the test step 406 back to the step 402, discussed above, for another iteration. Otherwise, if it is determined at the test step 406 that the migration is entering a final stage, then control transfers from the test step 406 to a step 408 where the data source is quiesced. Quiescing the data source at the step 408 may be performed by causing the storage system 304 to not accept (reject) any more writes from any external system coupled thereto (e.g., the host 308, discussed above). Alternatively, quiescing the data source at the step 408 may be performed by causing any external system coupled to the storage system 304, such as the host 308 and any other hosts coupled to the storage system 304, to stop writing to the storage system, 304. Following the step 408 is a step 412 where any remaining data that had not already been transferred is transferred from the storage system 304 to the cloud storage 302. Following the step 412, processing is complete.

In some embodiments, it is possible to migrate data from the storage system 304 to the cloud storage 302 without any special processing by the storage system 304. That is, the migration may be performed without the storage system 304 executing any software dedicated to migrating data. In such a case, the migration could be controlled entirely by the host 308 (or another appropriate external entity) providing conventional storage system commands to the storage system 304. Thus, for example, the steps 402, 404, discussed above, may be performed at the direction of the host 408 which provides appropriate commands to the storage system 304 to cause/direct the storage system 304 to take snapshots and transfer data to the cloud storage 302. As discussed above, quiescing at the step 408 may be performed by the host 308 (and other possible hosts) omitting (stopping, foregoing) write operations rather than by the storage system 304 rejecting writes thereto.

The determination of whether the migration is entering a final stage at the step 406 may be performed by the storage system 304, by the host 308, by a different entity, or some combination thereof. In the case of the storage system 304, the determination may be based on a certain amount (e.g., certain percentage) of data having already been transferred, a particular amount of time having passed since the migration process was started, or any other appropriate criteria. The host 308 may use similar criteria. A different entity could also use similar criteria or may use other criteria altogether. For example, if the different entity is the storage system 306 that is receiving the migrated data, the different criteria could be that the storage system 306 needs to complete the migration to start performing work that had been performed by the combination of the storage system 304 and the host 308. The different criteria could also be that the storage system 306 has transferred all migrated data that is stored at the cloud storage 302.

In some embodiments, it may not be desired/necessary to obtain snapshots and thus the step 402 may be omitted. This is illustrated by alternative paths 414, 416 shown in FIG. 4. In such a case, data migrated at the step 404 is data that had not yet been transferred from the storage system 304 to the cloud storage 302. The system may keep track of data that has not yet been transferred using any appropriate mechanism.

In an embodiment herein, the storage system 306 receives the migrated data from the cloud storage 302 in a conventional fashion. That is, the storage system 306 receives (pulls) data from the cloud storage 302 as the data becomes available. The storage system 306 may not even be actively participating in the migration since, in some embodiments, all that is required of the storage system 306 is that all data made available at the cloud storage 302 by the storage system 304 be transferred to the storage system 306. In other embodiments, the storage system 306 may actively participate in the migration and possibly provide direction for the migration to the storage system 304 and/or the cloud storage 302.

Various embodiments discussed herein may be combined with each other in appropriate combinations in connection with the system described herein. Additionally, in some instances, the order of steps in the flow diagrams, flowcharts and/or described flow processing may be modified, where appropriate. Further, various aspects of the system described herein may be implemented using software, hardware, a combination of software and hardware and/or other computer-implemented modules or devices having the described features and performing the described functions. The system may further include a display and/or other computer components for providing a suitable interface with a user and/or with other computers.

Software implementations of the system described herein may include executable code that is stored in a non-transitory computer-readable medium and executed by one or more processors. The computer-readable medium may include volatile memory and/or non-volatile memory, and may include, for example, a computer hard drive, ROM, RAM, flash memory, portable computer storage media such as a CD-ROM, a DVD-ROM, an SD card, a flash drive or other drive with, for example, a universal serial bus (USB) interface, and/or any other appropriate tangible or non-transitory computer-readable medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of migrating data from a first storage system to a second storage system, comprising:
transferring an initial portion of the data directly from the first storage system to a cloud storage that is interposed between the first storage system and the second storage system, wherein the second storage system is bypassed when the initial portion of the data is transferred from the first storage system to the cloud storage;

transferring the initial portion of the data from the cloud storage to the second storage system;

quiescing writes to the first storage system in response to entering a final stage of migration and only after transferring the initial portion of the data and prior to transferring remaining data from the first storage system to the cloud storage, wherein the final stage of migration is entered based on a certain amount of data having already been transferred in connection with the migration or on a particular amount of time having passed since the migration was started; and transferring remaining data from the cloud storage to the second storage system to complete migration of the data.

2. A method, according to claim 1, wherein the cloud storage is accessible only through a private network.

3. A method, according to claim 1, wherein the cloud storage is accessible via the World Wide Web.

4. A method, according to claim 1, wherein quiescing the first storage system includes the first storage system rejecting write operations.

5. A method, according to claim 1, wherein quiescing the first storage system includes one or more external systems coupled to the first storage system foregoing write operations.

6. A method, according to claim 1, wherein transferring data between the cloud storage and the storage systems and quiescing the first storage system is performed by one or more hosts coupled to the storage systems providing conventional storage system commands to the storage systems.

7. A method, according to claim 1, further comprising:
performing snapshots at the first storage system, wherein the data transferred from the first storage system to the cloud storage corresponds to the snapshots.

8. A method, according to claim 7, wherein snapshots are performed at the first storage system in response to commands provided by a host coupled to the first storage system.

9. A method, according to claim 1, wherein data is exchanged between a host system and the first storage system at least during an initial phase of migrating data.

10. A method, according to claim 9, wherein data being exchanged between the host system and the first storage system is suspended during a subsequent phase of migrating data that follows the initial phase of migrating data.

11. A non-transitory computer readable medium containing software that migrates data from a first storage system to a second storage system, the software comprising:
executable code that transfers an initial portion of the data directly from the first storage system to a cloud storage that is interposed between the first storage system and the second storage system, wherein the second storage system is bypassed when the initial portion of the data is transferred from the first storage system to the cloud storage;
executable code that transfers the initial portion of the data from the cloud storage to the second storage system;
executable code that quiesces writes to the first storage system in response to entering a final stage of migration and only after transferring the initial portion of the data and prior to transferring remaining data from the first storage system to the cloud storage, wherein the final stage of migration is entered based on a certain amount of data having already been transferred in connection with the migration or on a particular amount of time having passed since the migration was started; and
executable code that transfers remaining data from the cloud storage to the second storage system to complete migration of the data.

12. A non-transitory computer readable medium, according to claim 11, wherein the cloud storage is accessible only through a private network.

13. A non-transitory computer readable medium, according to claim 11, wherein the cloud storage is accessible via the World Wide Web.

14. A non-transitory computer readable medium, according to claim 11, wherein quiescing the first storage system includes the first storage system rejecting write operations.

15. A non-transitory computer readable medium, according to claim 11, wherein quiescing the first storage system includes one or more external systems coupled to the first storage system foregoing write operations.

16. A non-transitory computer readable medium, according to claim 11, wherein transferring data between the cloud storage and the storage systems and quiescing the first storage system is performed by one or more hosts coupled to the storage systems providing conventional storage system commands to the storage systems.

17. A non-transitory computer readable medium, according to claim 11, further comprising:
executable code that performs snapshots at the first storage system, wherein the data transferred from the first storage system to the cloud storage corresponds to the snapshots.

18. A non-transitory computer readable medium, according to claim 17, wherein snapshots are performed at the first storage system in response to commands provided by a host coupled to the first storage system.

19. A non-transitory computer readable medium, according to claim 11, wherein data is exchanged between a host system and the first storage system at least during an initial phase of migrating data.

20. A non-transitory computer readable medium, according to claim 19, wherein data being exchanged between the host system and the first storage system is suspended during a subsequent phase of migrating data that follows the initial phase of migrating data.

* * * * *